US010971727B2

(12) United States Patent
Duan et al.

(10) Patent No.: US 10,971,727 B2
(45) Date of Patent: Apr. 6, 2021

(54) SOLVATED GRAPHENE FRAMEWORKS AS HIGH-PERFORMANCE ANODES FOR LITHIUM-ION BATTERIES

(71) Applicant: THE REGENTS OF THE UNIVERSITY OF CALIFORNIA, Oakland, CA (US)

(72) Inventors: Xiangfeng Duan, Los Angeles, CA (US); Yuxi Xu, Los Angeles, CA (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 43 days.

(21) Appl. No.: 15/556,595

(22) PCT Filed: Mar. 9, 2016

(86) PCT No.: PCT/US2016/021601
§ 371 (c)(1),
(2) Date: Sep. 7, 2017

(87) PCT Pub. No.: WO2016/145106
PCT Pub. Date: Sep. 15, 2016

(65) Prior Publication Data
US 2018/0047985 A1    Feb. 15, 2018

Related U.S. Application Data

(60) Provisional application No. 62/130,530, filed on Mar. 9, 2015.

(51) Int. Cl.
*H01M 4/133* (2010.01)
*H01M 4/587* (2010.01)
(Continued)

(52) U.S. Cl.
CPC .......... *H01M 4/587* (2013.01); *H01M 4/133* (2013.01); *H01M 4/1393* (2013.01);
(Continued)

(58) Field of Classification Search
None
See application file for complete search history.

(56) References Cited

U.S. PATENT DOCUMENTS

2009/0117467 A1   5/2009   Zhamu et al.
2011/0111299 A1   5/2011   Liu et al.
(Continued)

FOREIGN PATENT DOCUMENTS

CN      103500822 A       1/2014
WO   WO-2011/019764 A1    2/2011
WO   WO-2014/134663 A1    9/2014

OTHER PUBLICATIONS

Zhao et al., Flexible Holey Graphene Paper Electrodes with Enhanced Rate Capability for Energy Storage Applications; ACS Nano 2011, 5, 11, 8739-8749, Publication Date: Oct. 8, 2011. (Year: 2011).*
(Continued)

*Primary Examiner* — Lucas J. O'Donnell
(74) *Attorney, Agent, or Firm* — Foley & Lardner LLP

(57) ABSTRACT

A lithium-ion battery includes: 1) an anode; 2) a cathode; and 3) an electrolyte disposed between the anode and the cathode and including lithium ions. The anode includes a graphene framework film including interconnected graphene sheets, and the graphene framework film has a specific surface area of 600 $m^2$ $g^{-1}$ or more.

12 Claims, 8 Drawing Sheets

(51) Int. Cl.
  *H01M 4/1393* (2010.01)
  *H01M 10/0525* (2010.01)
  *H01M 10/0568* (2010.01)
  *H01M 10/0569* (2010.01)
  *H01M 4/02* (2006.01)
  *H01M 4/36* (2006.01)

(52) U.S. Cl.
  CPC ........ *H01M 10/0525* (2013.01); *H01M 4/364* (2013.01); *H01M 10/0568* (2013.01); *H01M 10/0569* (2013.01); *H01M 2004/021* (2013.01); *H01M 2004/027* (2013.01)

(56) References Cited

U.S. PATENT DOCUMENTS

| | | | |
|---|---|---|---|
| 2013/0095389 A1 | 4/2013 | Bhardwaj et al. | |
| 2013/0224603 A1 | 8/2013 | Chen et al. | |
| 2014/0015160 A1* | 1/2014 | Kung | H01B 1/04 264/105 |
| 2014/0017552 A1 | 1/2014 | Wang et al. | |
| 2014/0030590 A1 | 1/2014 | Wang et al. | |
| 2014/0255803 A1 | 9/2014 | Ng et al. | |
| 2015/0258503 A1* | 9/2015 | Sinton | B01D 69/12 95/49 |
| 2015/0336202 A1* | 11/2015 | Bedworth | H01J 37/31 428/137 |
| 2016/0043384 A1* | 2/2016 | Zhamu | H01M 4/133 429/231.4 |

OTHER PUBLICATIONS

Zhang et al., Mechanically strong and highly conductive graphene aerogel and its use as electrodes for electrochemical power sources; J. Mater. Chem., 2011, 21, 6494. (Year: 2011).*
European Supplementary Search Report, issued in European Patent Application No. 16762451.9, 10 pages (dated Feb. 7, 2019).
European Supplementary Partial Search Report, issued in European Patent Application No. 16762451.9, 12 pages (dated Oct. 2, 2018).
International Search Report and Written Opinion for International Application No. PCT/US2016/021601 dated Jun. 15, 2016, 13 pages.
Xu Y et al. (2014), "Holey graphene frameworks for highly efficient capacitive energy storage", Nature Communications, 5:4554, pp. 1-8.
Examination Report on EP Application No. 16762451.9 dated Jan. 16, 2020, 6 pages.
First Office Action and Search Report on CN Application No. 201680022884.8 dated Apr. 2, 2020, 15 pages (English Translation).

* cited by examiner

SOLVATED GRAPHENE FRAMEWORKS AS HIGH-PERFORMANCE ANODES FOR LITHIUM-ION BATTERIES

CROSS REFERENCE TO RELATED APPLICATION

This application is a National Stage Entry of International Application No. PCT/US2016/021601, filed on Mar. 9, 2016, which claims the benefit of U.S. Provisional Application Ser. No. 62/130,530, filed on Mar. 9, 2015, the contents of which are incorporated herein by reference in their entireties.

TECHNICAL FIELD

This disclosure generally relates to electrochemical energy storage and, more particularly, to lithium-ion batteries based on graphene electrodes.

BACKGROUND

Electrochemical energy storage has becoming a core technology for sustainable, clean and efficient energy supply. In this regard, lithium-ion batteries (LIBs) with high energy and power densities are highly desired for advanced portable electronic devices and electric vehicles, among other applications. Electrode materials are central components of LIBs and can largely dictate their ultimate performance. Although graphite has been widely used as anode materials in current commercial LIBs, its low theoretical capacity (about 372 mAh $g^{-1}$) and poor rate capability cannot meet the increasing demands for developing next-generation LIBs. Graphene has been considered as a promising alternative electrode material for LIBs due to its superior intrinsic electrical conductivity, high specific surface area, excellent mechanical flexibility and broad electrochemical window. However, the strong van der Waals and π-π stacking interactions between graphene sheets make them prone to aggregate to form graphite-like powders or films with dense layered microstructures when the graphene sheets are processed into bulk electrode materials, leading to a severely decreased surface area and much higher Li ion diffusion resistance and therefore inefficient utilization of graphene sheets for Li storage. Furthermore, either, or both, polymer binder and conductive additives are generally included in electrode preparation, which increases the complexity of electrode preparation and also increases the weight of passive component and imposes an adverse effect on the electrochemical performance.

It is against this background that a need arose to develop the embodiments described herein.

SUMMARY

Some embodiments of this disclosure are directed to a solvent exchange approach to prepare solvated graphene frameworks as high performance anode materials for LIBs. Resulting mechanically strong graphene frameworks can exhibit hierarchical solvated porosity, and can be directly used as electrodes with significantly improved electrochemical performance compared to unsolvated graphene frameworks, including ultra-high reversible capacity, excellent rate capability and superior cycling stability. In some embodiments, a graphene framework electrode can deliver a (discharge or charge) capacity, when cycled versus Li$^+$/Li at a current density of about 0.1 A $g^{-1}$ (or another higher or lower reference current density) after the 30$^{th}$ cycle (e.g., at the 31$^{st}$ cycle or after), of about 500 mAh $g^{-1}$ or more, about 600 mAh $g^{-1}$ or more, about 700 mAh $g^{-1}$ or more, about 800 mAh $g^{-1}$ or more, about 900 mAh $g^{-1}$ or more, about 1000 mAh $g^{-1}$ or more, or about 1158 mAh $g^{-1}$ or more, and up to about 1200 mAh $g^{-1}$ or more, or up to about 1400 mAh $g^{-1}$ or more. In some embodiments, a graphene framework electrode can show excellent rate capability and can deliver a (discharge or charge) capacity, when cycled versus Li$^+$/Li at a current density of about 5.0 A $g^{-1}$ (or another current density that is 50 times the reference current density) after the 30$^{th}$ cycle (e.g., at the 31$^{st}$ cycle or after), of about 150 mAh $g^{-1}$ or more, about 200 mAh $g^{-1}$ or more, about 250 mAh $g^{-1}$ or more, about 300 mAh $g^{-1}$ or more, about 350 mAh $g^{-1}$ or more, about 400 mAh $g^{-1}$ or more, about 450 mAh $g^{-1}$ or more, or about 472 mAh $g^{-1}$ or more, and up to about 600 mAh $g^{-1}$ or more, or up to about 700 mAh $g^{-1}$ or more. In some embodiments, a graphene framework electrode can show superior cycling stability with about 50% or more, about 60% or more, about 70% or more, about 80% or more, about 90% or more, or about 93% or more capacity retention over 500 charge/discharge cycles, when cycled versus Li$^+$/Li at a current density of about 5.0 A $g^{-1}$ (or another higher or lower current density).

Some aspects of this disclosure are directed to a LIB. In some embodiments, the LIB includes: 1) an anode; 2) a cathode; and 3) an electrolyte disposed between the anode and the cathode and including lithium ions. The anode includes a graphene framework film including interconnected graphene sheets, and the graphene framework film has a specific surface area of about 600 m$^2$ g$^{-1}$ or more.

In some embodiments, the specific surface area of the graphene framework film is about 900 m$^2$ g$^{-1}$ or more.

In some embodiments, the graphene framework film has a packing density of about 0.3 g cm$^{-3}$ or more.

In some embodiments, the graphene sheets include nanopores formed in basal planes of the graphene sheets. In some embodiments, at least one of the nanopores has a size in the range of 1 nm to 100 nm.

In some embodiments, the anode further includes an electrochemically active material incorporated in the graphene framework film.

Other aspects of this disclosure are directed to a method of forming an electrode for a LIB. In some embodiments, the method includes: 1) forming a graphene hydrogel; and 2) exchanging water of the graphene hydrogel with an electrolyte including lithium ions to form a solvated graphene framework.

In some embodiments, forming the graphene hydrogel includes heating an aqueous dispersion of graphene oxide under reducing conditions to yield reduction of graphene oxide to graphene and self-assembly of graphene into the graphene hydrogel.

In some embodiments, heating the dispersion of graphene oxide is in the presence of an etchant to yield formation of nanopores in graphene.

In some embodiments, exchanging water of the graphene hydrogel includes immersing the graphene hydrogel in the electrolyte.

In some embodiments, exchanging water of the graphene hydrogel includes exchanging water of the graphene hydrogel with a hydrophilic liquid, followed by exchanging the hydrophilic liquid with the electrolyte.

In some embodiments, the method further includes mechanically compressing the solvated graphene framework against a current collector.

In some embodiments, the electrolyte includes a lithium salt dispersed in an organic solvent. In some embodiments, the lithium salt is lithium hexafluorophosphate, lithium tetrafluoroborate, or lithium perchlorate. In some embodiments, the organic solvent is a carbonate ester.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

DETAILED DESCRIPTION

Monolithic graphene frameworks with three-dimensional (3D) interconnected porous network are of interest in electrochemical energy storage devices because of their large specific surface area, multi-dimensional continuous electron transport pathways and rapid ion diffusion characteristics as well as excellent mechanical strength. Taking advantage of these desirable features of graphene frameworks, considerable interest relates to incorporation of various nanostructured transition metal oxides and sulfides into the graphene frameworks to prepare 3D hybrids, which can efficiently combine the advantages of both components and show high reversible capacity, fast charge/discharge rate and good cycle performance as anode materials for LIBs. However, interest in 3D graphene hybrids largely focuses on graphene aerogels, prepared by freeze-drying of a hydrogel precursor which can disturb a pristine microstructure of graphene frameworks and thus impede achieving the full potential of 3D graphene materials. Also, interest in graphene frameworks as electrodes for supercapacitors does not necessarily translate to applicability for LIBs, in view of differences in manner of operation between supercapacitors and LIBs (electrical-double-layer capacitive behavior versus operation at least partially based on intercalation/de-intercalation of lithium ions) and differences in ions involved (lithium ions in the case of LIBs versus other ions in the case of supercapacitors) and the potential impact of these differences on cycling stability for LIBs. An improved approach towards graphene frameworks as anode materials is desired for the development of 3D graphene materials for their applications in LIBs.

To address the challenges of LIBs, embodiments of this disclosure are directed to solvated graphene frameworks for use as electrode materials and the preparation thereof. A graphene framework of some embodiments has a hierarchical porous structure, and can be used in binder-free (or substantially binder-free) and conductive additive-free (or substantially conductive additive-free) LIB electrodes with large ion-accessible surface area, high packing density, excellent electrical conductivity and high ion transport rate, thereby providing LIBs with high reversible capacity, excellent rate capability and superior cycling stability.

As will be understood, graphene is an allotrope of carbon, and its structure is typically one-atom-thick sheets of sp$^2$-bonded carbon atoms that are packed in a honeycomb crystal lattice. In some embodiments, graphene is provided in the form of thin sheets of substantially a monolayer of carbon atoms that can be envisioned as unrolled carbon nanotubes, although a bilayer or other multilayer of graphene is also contemplated.

Figure 1A:
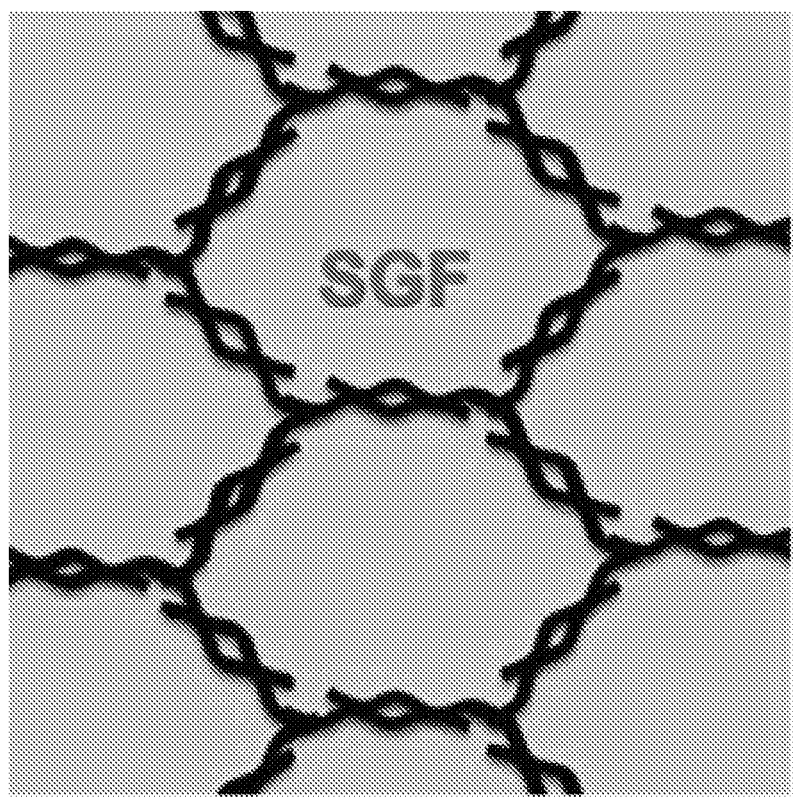
FIG. 1A: Schematic illustration of a solvated graphene framework (SCSI as a material for LIB electrodes.

Attention first turns to FIG. 1A, which illustrates a solvated graphene framework, according to an embodiment of this disclosure. The graphene framework is formed by conjugating graphene sheets into a free-standing 3D network. In some embodiments, graphene sheets in the graphene framework have nanopores that are formed in-plane or in basal planes of the graphene sheets, as shown in FIG.

1B. During preparation, the graphene framework is initially hydrated to form a hydrogel, and, to preserve a hierarchical porosity of the graphene framework, water is replaced by another liquid medium through one or more steps according to a solvent exchange approach. In some embodiments, the liquid medium is a suitable liquid electrolyte for LIBs, and can include an organic solvent or a combination of two or more different organic solvents, along with lithium ions derived from a lithium salt. Examples of suitable organic solvents include carbonate esters, such as ethylene carbonate, dimethyl carbonate and diethyl carbonate. Ionic liquids also can be suitable organic solvents. Examples of suitable lithium salts include lithium hexafluorophosphate ($LiPF_6$), lithium tetrafluoroborate ($LiBF_4$) and lithium perchlorate ($LiClO_4$), and a lithium salt can be included in the liquid medium at a concentration of about 0.05 molar (M) or more, about 0.1 M or more, about 0.2 M or more, about 0.3 M or more, about 0.4 M or more, or about 0.5 M or more, and up to about 1 M or more, up to about 1.5 M or more, or up to about 2 M or more. The structure of the graphene framework satisfies several criteria for a desirable LIB electrode.

For example, the graphene sheets in the graphene framework are highly interconnected and interlocked together to mitigate against their restacking and to maintain a highly porous monolithic structure (FIG. 1A) with a large specific surface area, such as about 550 $m^2\ g^{-1}$ or more, about 600 $m^2\ g^{-1}$ or more, about 700 $m^2\ g^{-1}$ or more, about 800 $m^2\ g^{-1}$ or more, about 900 $m^2\ g^{-1}$ or more, or about 980 $m^2\ g^{-1}$ or more, and up to about 1000 $m^2\ g^{-1}$ or more, or up to about 1100 $m^2\ g^{-1}$ or more, based on methylene blue dye adsorption. The formation of in-plane nanopores in the graphene sheets (FIG. 1B) can further boost the specific surface area, such as about 1000 $m^2\ g^{-1}$ or more, about 1100 $m^2\ g^{-1}$ or more, about 1200 $m^2\ g^{-1}$ or more, about 1300 $m^2\ g^{-1}$ or more, about 1400 $m^2\ g^{-1}$ or more, or about 1500 $m^2\ g^{-1}$ or more, and up to about 1600 $m^2\ g^{-1}$ or more, or up to about 1800 $m^2\ g^{-1}$ or more, based on methylene blue dye adsorption.

As another example, the graphene framework with interlocked graphene sheets can be mechanically compressed to form a free-standing, compact graphene framework film, with little or no restacking to achieve a high packing density, while maintaining the initial solvated condition. With mechanical compression, the packing density can be about 0.1 $g\ cm^{-3}$ or more, about 0.2 $g\ cm^{-3}$ or more, about 0.3 $g\ cm^{-3}$ or more, about 0.4 $g\ cm^{-3}$ or more, about 0.5 $g\ cm^{-3}$ or more, about 0.6 $g\ cm^{-3}$ or more, or about 0.65 $g\ cm^{-3}$ or more, and up to about 0.7 $g\ cm^{-3}$ or more, or up to about 1 $g\ cm^{-3}$ or more.

As another example, the graphene framework can exhibit excellent electrical conductivity, such as about 500 $S\ m^{-1}$ or more, about 600 $S\ m^{-1}$ or more, about 700 $S\ m^{-1}$ or more, about 800 $S\ m^{-1}$ or more, about 900 $S\ m^{-1}$ or more, or about 950 $S\ m^{-1}$ or more, and up to about 1100 $S\ m^{-1}$ or more, or up to about 1500 $S\ m^{-1}$ or more. The high electrical conductivity allows the graphene framework to be used as LIB electrodes directly, with the omission of a polymer binder and conductive additives (or their inclusion at reduced levels). The inclusion of a polymer binder and conductive additives can increase the complexity of electrode preparation, and also can impose an adverse impact on specific capacitance performance.

Figure 1B:
FIG. 1B: Schematic illustration of graphene sheets formed with nanopores that can function as ion transport pathways between neighboring layers of graphene sheets to accelerate ion transport.

As a further example, pores in the graphene framework are sufficiently large and well integrated into a hierarchical porous structure to form a highly continuous network of open channels for efficient ion transport substantially throughout the entire network even under a highly compressed form. In particular, the graphene sheets are assembled to form an interconnected 3D macroporous network, with pores between the graphene sheets with sizes ranging from sub-micrometers to several micrometers, such as from about 5 nm, from about 10 nm, from about 100 nm, or from about 500 nm, and up to about 1 µm, up to about 5 µm, up to about 10 µm, or more, and pore walls composed of a single layer or few layers of graphene sheets. In conjunction and if present, the in-plane nanopores in graphene sheets are large enough to function as ion diffusion shortcuts between different layers of graphene to greatly accelerate ion transport across substantially the entire network and facilitate ion access to substantially the entire surface area (FIG. 1B). The in-plane nanopores can have sizes from about 1 nm, from about 2 nm, from about 3 nm, from about 4 nm, or from about 5 nm, and up to about 10 nm, up to about 20 nm, up to about 50 nm, up to about 100 nm, or more. For example, the in-plane nanopores can have sizes from about 1 nm to about 100 nm or from about 1 nm to about 10 nm.

In some embodiments, a graphene framework is formed through self-assembly of graphene into 3D networks. In some embodiments, an aqueous dispersion of graphene oxide (GO) can be subjected to a hydrothermal process, such as by sealing in an autoclave and heating at a temperature from about 100° C. to about 250° C. (or from about 130° C.' to about 250° C.) for about 1 hour to about 10 hours to yield a mechanically strong monolithic graphene hydrogel. During the hydrothermal process, GO sheets can be reduced and self-assembled into a hydrogel with an interconnected 3D macroporous network. If nanopores are to be formed, a one-step process can be used, with a combination of reduction of GO to form graphene and formation of nanopores in graphene. Specifically, a controlled amount of $H_2O_2$ (or another suitable etchant) can be combined with, or introduced into, the GO dispersion, and, during the hydrothermal process, GO sheets can be reduced and self-assembled into a hydrogel, while $H_2O_2$ can partially oxidize and etch carbon atoms around defective sites of GO, leaving behind carbon vacancies which gradually extend into nanopores. It is also contemplated that the formation of nanopores can be carried out sequentially with respect to reduction of GO sheets and self-assembly into a hydrogel according to a two-step process.

Once formed, a hydrated graphene hydrogel can be subjected to a one-step or a multi-step solvent exchange to replace its interior water with a desired liquid medium, such as a suitable liquid electrolyte for LIBs as explained previously. In the case of a desired liquid medium that is hydrophilic, a one-step solvent exchange can be applied to replace the interior water with the hydrophilic liquid medium, such as by immersing the graphene hydrogel in the liquid medium under vacuum or low pressure (about 0.1 atm or less or about 0.01 atm or less) and heating at a temperature from about 40° C. to about 150° C. for about 1 hour to about 15 hours. In the case of a desired liquid medium that is hydrophobic, a two-step (or multi-step) solvent exchange can be applied to first replace the interior water with a hydrophilic liquid medium, followed by replacing the hydrophilic liquid medium with the desired hydrophobic liquid medium. A hydrophilic liquid medium, such as an ionic liquid, an alcohol, an amide, or another polar aprotic or polar protic organic solvent, can have a solubility in water at 20° C. of at least about 5 g per 100 g of water or at least about 10 g per 100 g of water, while a hydrophobic liquid medium, such as a non-polar organic solvent, can have a solubility in water at 20° C. of less than about 5 g per 100 g of water.

Additional embodiments of graphene frameworks are encompassed by this disclosure. For example, a graphene framework of some embodiments can incorporate one or more electrochemically active materials to further improve electrochemical performance. A mass loading of an active material in a graphene framework can be about 1 wt. % or more, about 5 wt. % or more, about 10 wt. % or more, about 15 wt. % or more, or about 2.0 wt. % or more, and up to about 30 wt. % or more or up to about 50 wt. % or more. Examples of active materials include electrochemically active metal oxides and sulfides in the form of nanoparticles, such as transition metal oxides and sulfides. The incorporation of an active material in a graphene framework can occur via adsorption of the active material on graphene sheets, growth of the active material on graphene sheets, or mixing or dispersion of the active material with, or among, graphene sheets. It is contemplated that the incorporation of an active material can be carried out in combination, or sequentially, with respect to reduction of GO sheets and self-assembly into a hydrogel.

The graphene framework electrode materials described herein can be used for a variety of batteries and other electrochemical energy storage devices. For example, the graphene framework electrode materials can be used for LIBs.

Figure 2:
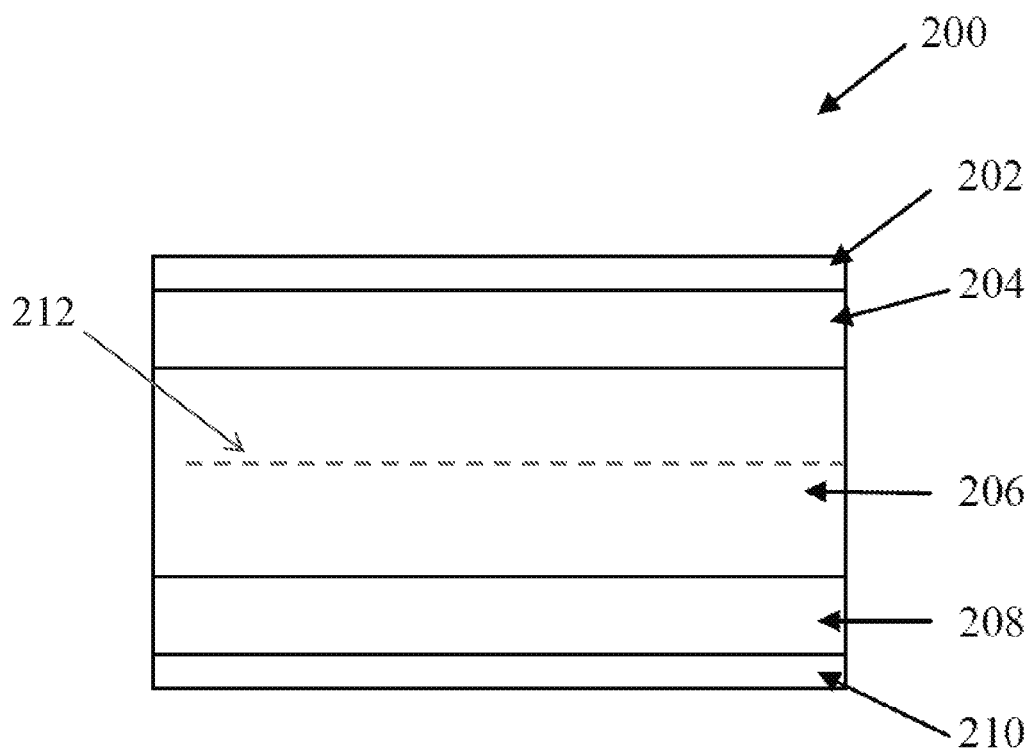
FIG. 2: Schematic of a LIB according to an embodiment of this disclosure.

FIG. 2 shows a schematic of a LIB 200 that includes a pair of electrodes, specifically an anode 204 and a cathode 208, and an electrolyte 206 that is disposed between the anode 204 and the cathode 208. A separator 212 also is disposed between the anode 204 and the cathode 208. The anode 204 includes, or is formed of, a graphene framework film as described herein. In some implementations, the anode 204 consists of, or consists essentially of, the graphene framework film. In some implementations, the anode 204 is substantially devoid of a binder and a conductive additive, such that the graphene framework film constitutes at least about 90 wt. %, at least about 93 wt. %, at least about 95 wt. %, or at least about 98 wt. % of the anode 204. The cathode 208 includes, or is formed of, a suitable LIB cathode material, such as lithium cobalt oxide ($LiCoO_2$), lithium manganese oxide ($LiMn_2O_4$ or $LiMnO_4$), lithium nickel manganese cobalt oxide, lithium iron phosphate, lithium nickel cobalt aluminum oxide, or lithium titanate. It is also contemplated that the cathode 208 can include a graphene framework film. As shown in FIG. 2, the LIB 200 also includes a pair of current collectors 202 and 210, and the anode 204 and the cathode 208 are connected to the current collectors 202 and 210, respectively. Together, the anode 204 and the current collector 202 (or the cathode 208 and the current collector 210) can correspond to an electrode structure for the LIB 200. It is also contemplated that either, or both, of the current collectors 202 and 210 can be omitted in some embodiments.

EXAMPLE

The following example describes specific aspects of some embodiments of this disclosure to illustrate and provide a description for those of ordinary skill in the art. The example should not be construed as limiting this disclosure, as the example merely provides specific methodology useful in understanding and practicing some embodiments of this disclosure.

This example reports the preparation of solvated graphene frameworks (SGFs) through a convenient solvent exchange approach for high-performance anodes in lithium-ion batteries (LIBs). The mechanically strong SGFs can be used directly as electrodes without adding any other binder or conductive additives and can deliver a very high reversible capacity of about 1158 mAh $g^{-1}$ at a charge/discharge rate of about 0.1 A $g^{-1}$, which is about 2.6 times that of unsolvated graphene frameworks (about 439 mAh $g^{-1}$). Moreover, the SGFs show excellent rate capability with a significant capacity of about 472 mAh $g^{-1}$ at a high charge/discharge rate of about 5.0 A $g^{-1}$ and superior cycling stability with about 93% capacity retention over 500 charge/discharge cycles at about 5.0 A $g^{-1}$. The electrochemical performance of SGFs is comparable to that reported of the best graphene-based anode material and can be attributed to a solvated porosity of SGFs, which promote higher specific surface area and faster Li ion diffusion than unsolvated graphene frameworks.

Figure 3:
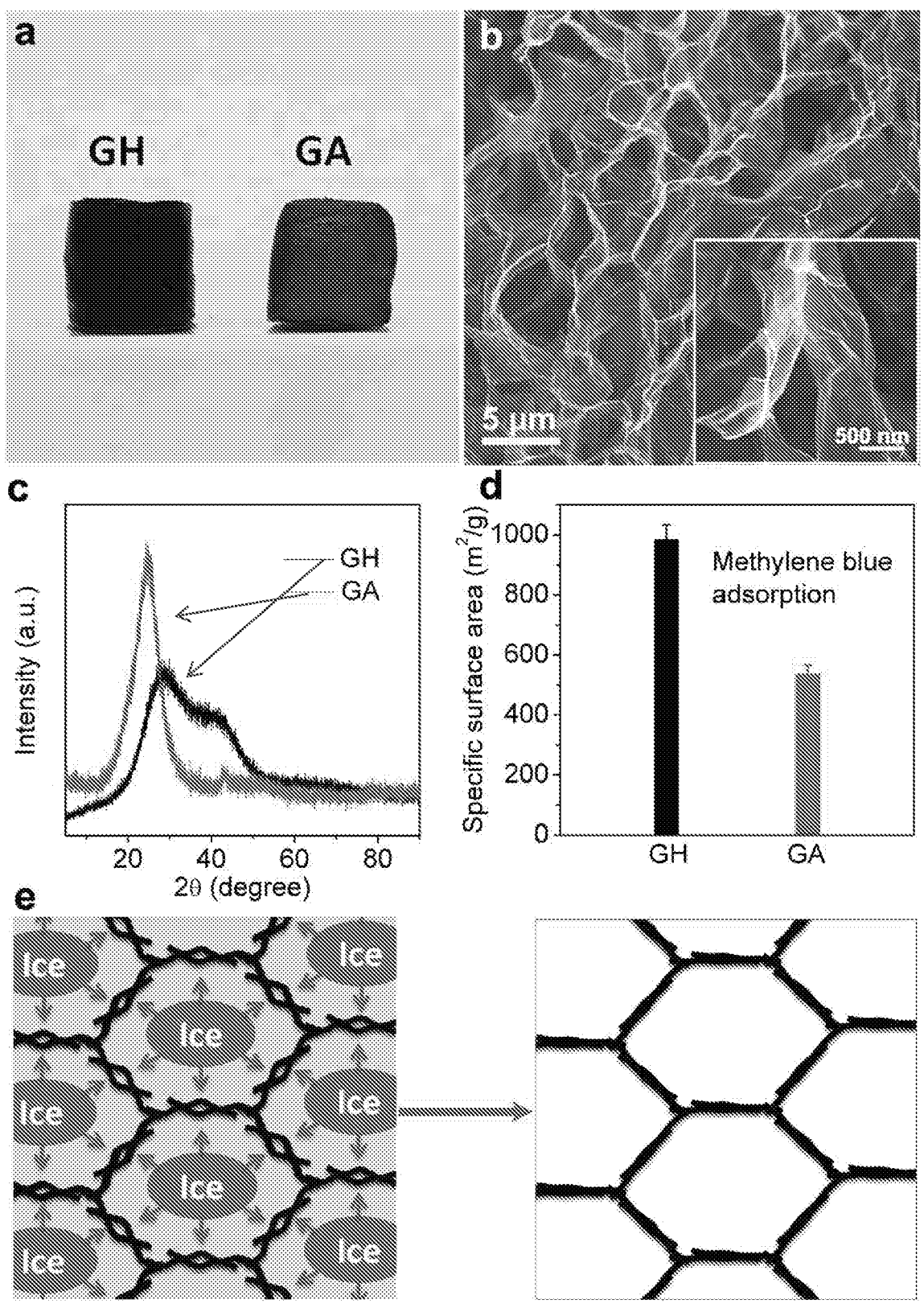
FIG. 3: a) images of graphene hydrogel (GH) and graphene aerogel (GA), b) Scanning electron microscopy (SEM) images of interior microstructures of GA with a high-magnification image shown in the inset. c) X-ray diffraction (XRD) patterns of GH and GA. d) Specific surface areas of GH and GA determined by methylene blue (MB) adsorption method. e) Schematic of the structrual evolution of GH upon freeze-drying.
Figure 7:
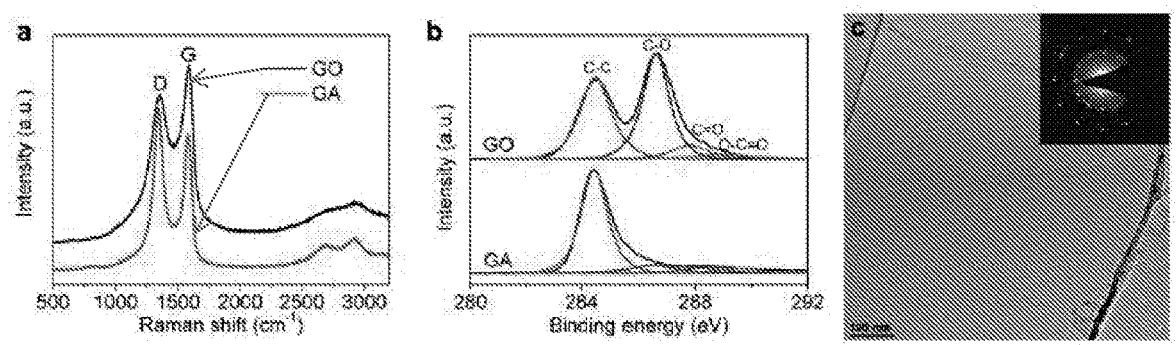
FIG. 7: a) Raman spectra of graphene oxide (GO) and GA. The significant increase in the intensity ratio of D peak to G peak indicates an efficient de-oxygenation of GO during the synthesis of GH. b) X-ray photoelectron spectroscopy (XPS) results of GO and GA, further confirming significant de-oxygenation of GO. c) Typical transmission electron microcopy (TEM) image of pore walls of GH and the corresponding electron diffraction patterns indicating three disoriented crystalline graphene sheets.

To prepare SGFs for LIB electrodes, free-standing graphene hydrogels (GHs) are first synthesized using a modified hydrothermal self-assembly method (FIG. 3a, left). After freeze-drying, graphene aerogels (GAs) are obtained which showed little change in shape and size compared to GHs (FIG. 3a, right). Scanning electron microscopy (SEM) images (FIG. 3b) revealed that the GA had an interconnected porous network with pore sizes ranging from sub-micrometers to several micrometers and pore walls composed of thin layers of stacked graphene sheets, which arises from a three-dimensional (3D) self-assembly of graphene. Raman spectra, X-ray photoelectron spectroscopy and transmission electron microcopy (TEM) studies confirmed the efficient reduction of graphene oxide (GO) during the synthesis of GH (FIG. 7). Although there was no noticeable appearance change between GH and GA, X-ray diffraction (XRD) patterns exhibited a remarkable difference (FIG. 3c). The GA showed a diffraction peak at about 25° corresponding to the d-spacing of about 0.36 nm, which is slightly higher than that of graphite (about 0.33 nm) due to the existence of residual oxygen functional groups on reduced GO. In contrast, the GH gave no prominent peak at this angle but showed much broader diffraction peak ranging from about 20° to about 50°, which indicates the worse ordering of graphene sheets along their stacking direction in GH compared to GA and is likely due to the water confined within the pore walls of GH. This result also indicates that the pore walls of GH are composed of few-layer stacked graphene sheets, consistent with the TEM studies (FIG. 7c).

Figure 8:
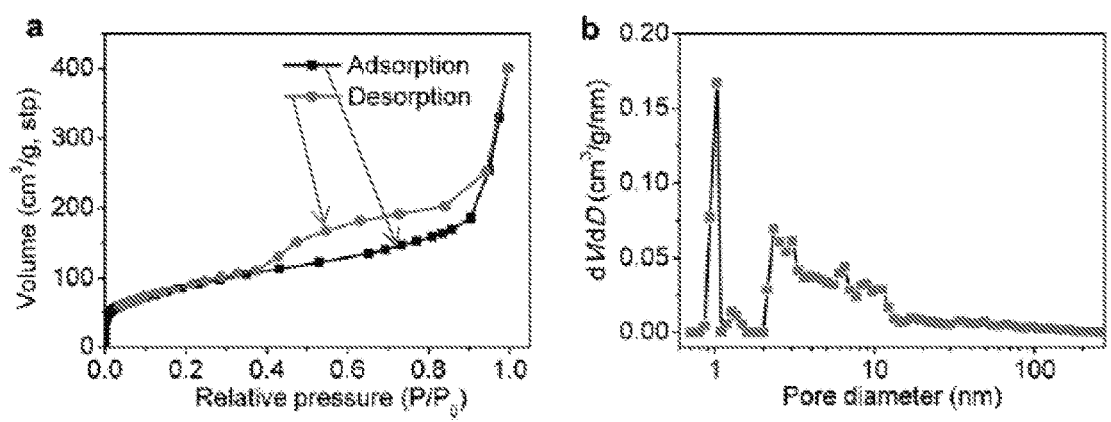
FIG. 8: a) $N_2$ isotherms and b) Density functional theory (DFT) pore-size distribution of GA. The results indicate that the GA has a Brunauer-Emmett-Teller (BET) specific surface area of about 270 m$^2$/g and a micro- and mesoporosity.

To further probe the microstructure difference inside GH and GA, methylene blue (MB) dye adsorption method is used to measure the specific surface areas of both samples. In contrast to the gas adsorption and desorption method, this MB dye adsorption approach can maintain the pristine wet condition of GH and determine its intrinsic specific surface area. Surprisingly, the GH showed a high specific surface area of about 980 $m^2$ $g^{-1}$, which is about 1.8 times that of GA (about 530 $m^2$ $g^{-1}$) (FIG. 3d). Together, these studies indicate that the face-to-face stacking of reduced GO sheets in the pore walls of GH is much less tight than the stacking of pristine graphene in graphite due to the flexible corrugated structure and colloidal interactions between hydrated reduced GO sheets containing oxygen functional groups, thus creating abundant micro- and mesopores within the pore walls of GH filled by water and accessible to molecules. Upon freeze-drying, a significant portion of the pores within the pore walls of GH were compressed by the gradual growth of ice crystals and the removal of water (FIG. 3e), resulting in stronger stacking of reduced GO within the pore walls and lower specific surface area in GAs, although some micro- and mesoporosities survived (FIG. 8). In addition, the macroporous network built by the pore walls can be retained after freeze-drying and thus no noticeable appearance change between GH and GA was observed.

Figure 4:
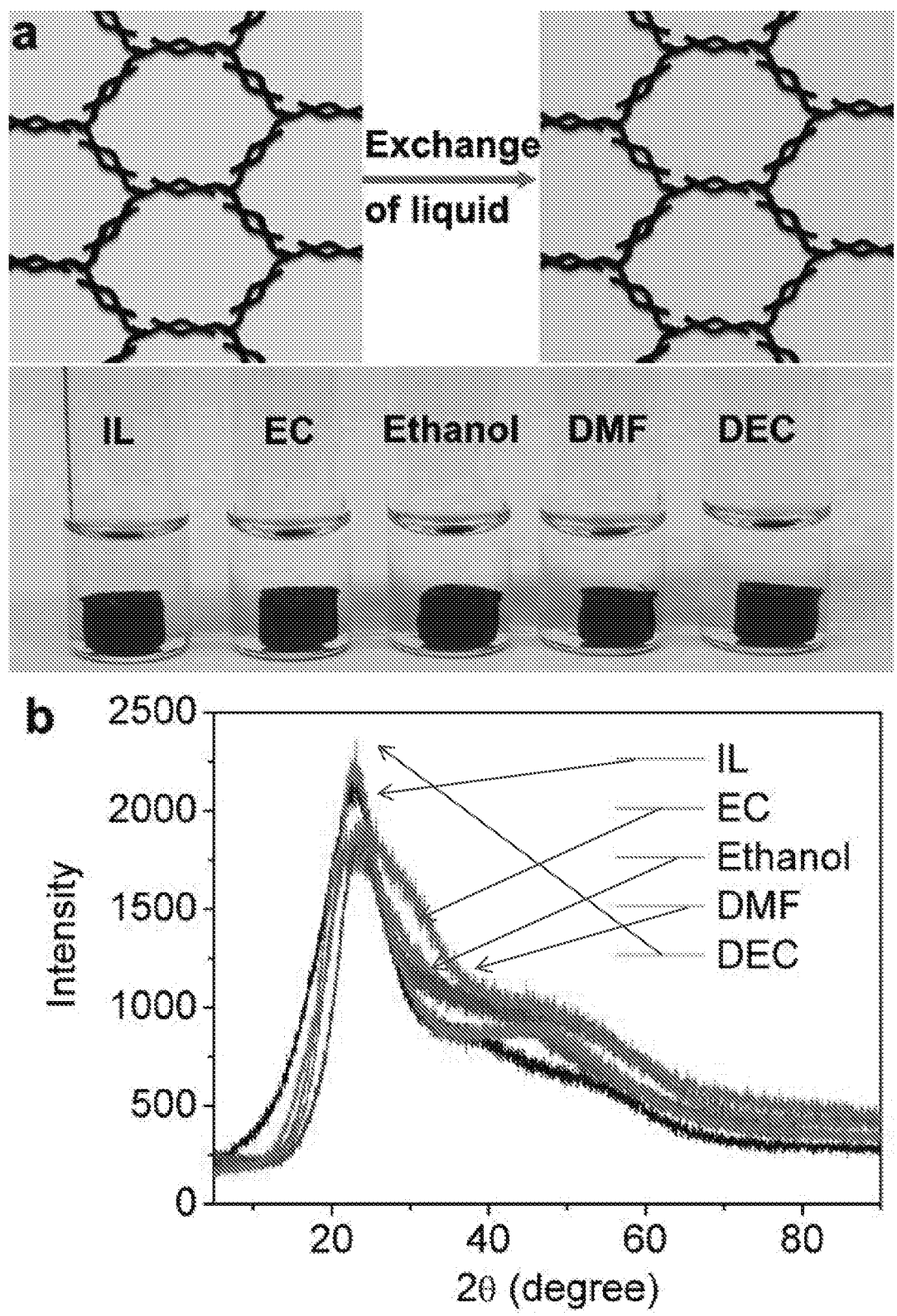
FIG. 4: a) Schematic of solvent exchange for preparation of SGFs (top) and images of SGFs in various organic solvents (bottom). b) XRD patterns of SGFs.

The hydrated GHs can allow one-step direct exchange of their interior water with hydrophilic organic solvents such as ionic liquid (IL), ethanol, ethylene carbonate (EC) and dimethylformamide (DMF) to prepare a variety of SGFs (FIG. 4a). Even using water-insoluble diethyl carbonate (DEC), a two-step procedure can be followed with ethanol and DEC as the successive exchanging solvents to prepare the SGF substantially fully infiltrated with DEC (FIG. 4a). Although XRD patterns of the SGFs showed a peak shift compared with that of GH potentially due to the different solvation effects on the reduced GO sheets, similarly broad diffraction peaks were observed, indicating the unusual stacking structure of the reduced GO and the hierarchical porosity in GH were largely retained in SGFs (FIG. 4b), which is particularly important to extend the function of SGFs for various applications.

Figure 5:
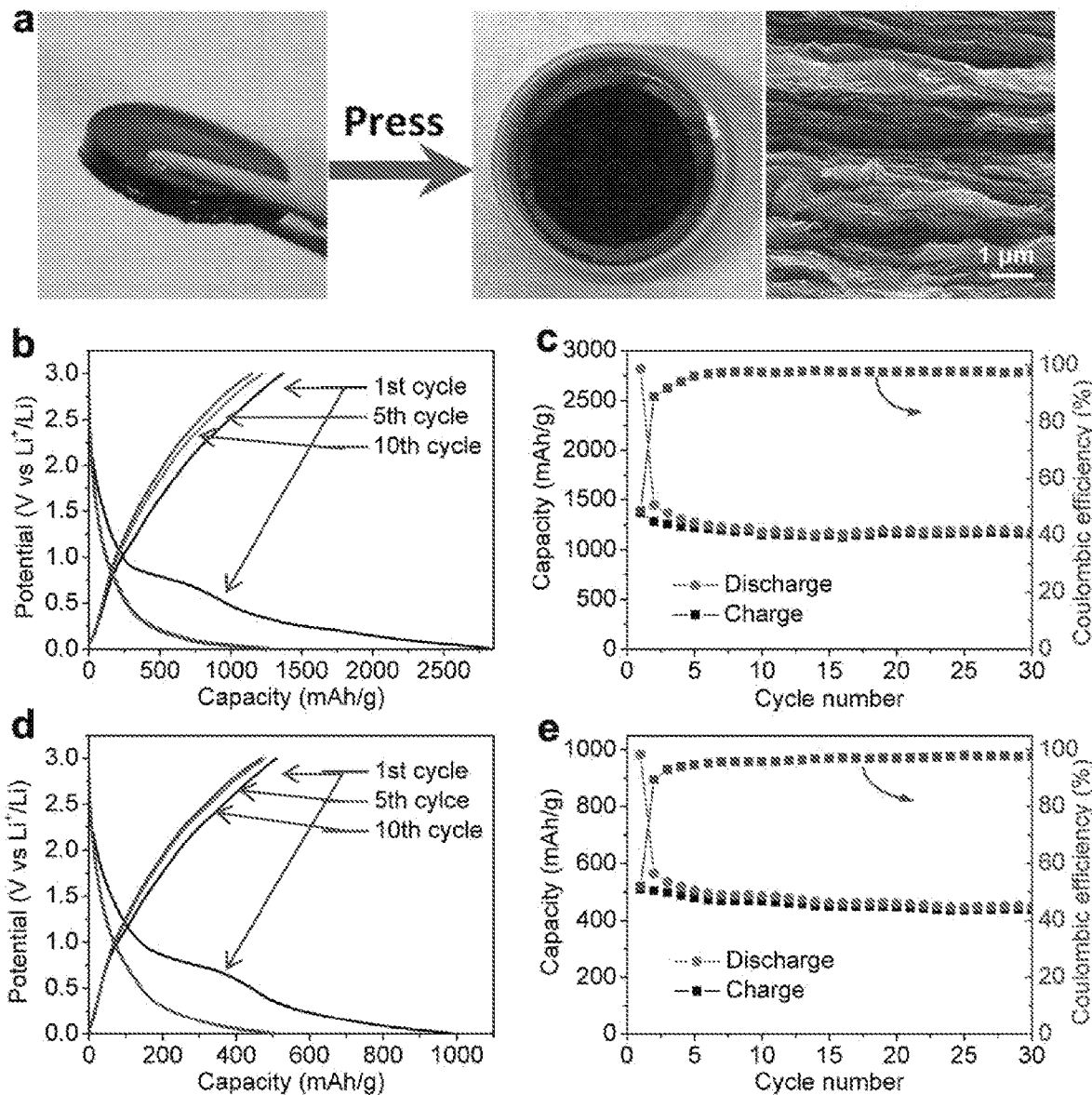
FIG. 5: a) Preparation of a binder-free SGF electrode. A piece of SGF (left), a pressed film electrode on copper foil placed in a coin cell case (middle), and SEM image of a cross-section of the pressed SGF film (right). b) Galvanostatic charge/discharge profiles and C) cycle performance and Coulombic efficiency of the SGF electrode at a low current density of about 0.1 A g−1 between about 3.0 and about 0.01 V versus Li+/Li. d) Galvanostatic charge/discharge profiles and e) cycle performance and Coulombic efficiency of the GA electrode at a low current density of about 0.1 A g−1 between about 3.0 and about 0.01 V versus Li+/Li.
Figure 9:
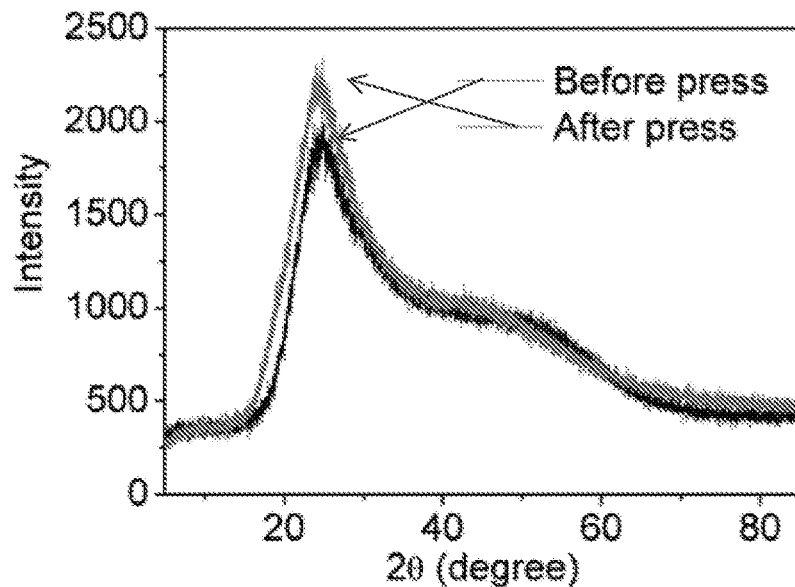
FIG. 9: XRD patterns of SGFs before and after pressing.

To study the electrochemical performance of SGFs as anode materials in LIBs, the solvent exchange method is used to prepare SGF infiltrated with about 1 M LiPF$_6$ in EC/DEC electrolyte. A piece of about 2 mm-thick mechanically strong SGF was pressed on copper foil to form an about 30 μm-thick SGF film, which was used as an electrode directly without adding any other additives or further impregnation with electrolyte to assemble cells (FIG. 5a). The pressed SGF film with a graphene packing density of about 0.65 g cm$^{-3}$ showed a high electrical conductivity of about 950 S m$^{-1}$. XRD studies of SGFs before and after pressing (FIG. 9) showed similar diffraction peak width and intensity, indicating that little re-stacking of graphene sheets occurred and the unusual solvated porosity was largely maintained in the pressed SGF film due to the robust interlock of graphene sheets in the SGF. For comparison, the GA was also tested under the same condition as the SGF. FIG. 5b-e show the galvanostatic charge/discharge profiles of SGF and GA electrodes at a current density of about 0.1 A g$^{-1}$ within a cutoff voltage window of 0.01-3.0 V versus Li$^+$/Li. The SGF electrode delivered a specific capacity of about 2815 mAh g$^{-1}$ in the initial discharging and a reversible capacity of about 1367 mAh g$^{-1}$ in the first charging cycle with a Coulombic efficiency of about 48.5%. The presence of a plateau at about 0.8 V and the irreversible capacity loss in the first cycle could be associated with the electrolyte decomposition and the formation of solid-electrolyte-interphase (SEI) on the electrode surface (FIG. 5b). The capacity of SGF electrode became stable after five charge/discharge cycles. The SGF electrode exhibited a high reversible capacity of about 1158 mAh g$^{-1}$ after 30 cycles with a high capacity retention of about 85% (FIG. 5c). In contrast, the GA electrode showed much lower reversible capacities of about 510 and about 439 mAh g$^{-1}$ in the first cycle and after 30 cycles, respectively (FIG. 5d, e).

Figure 6:
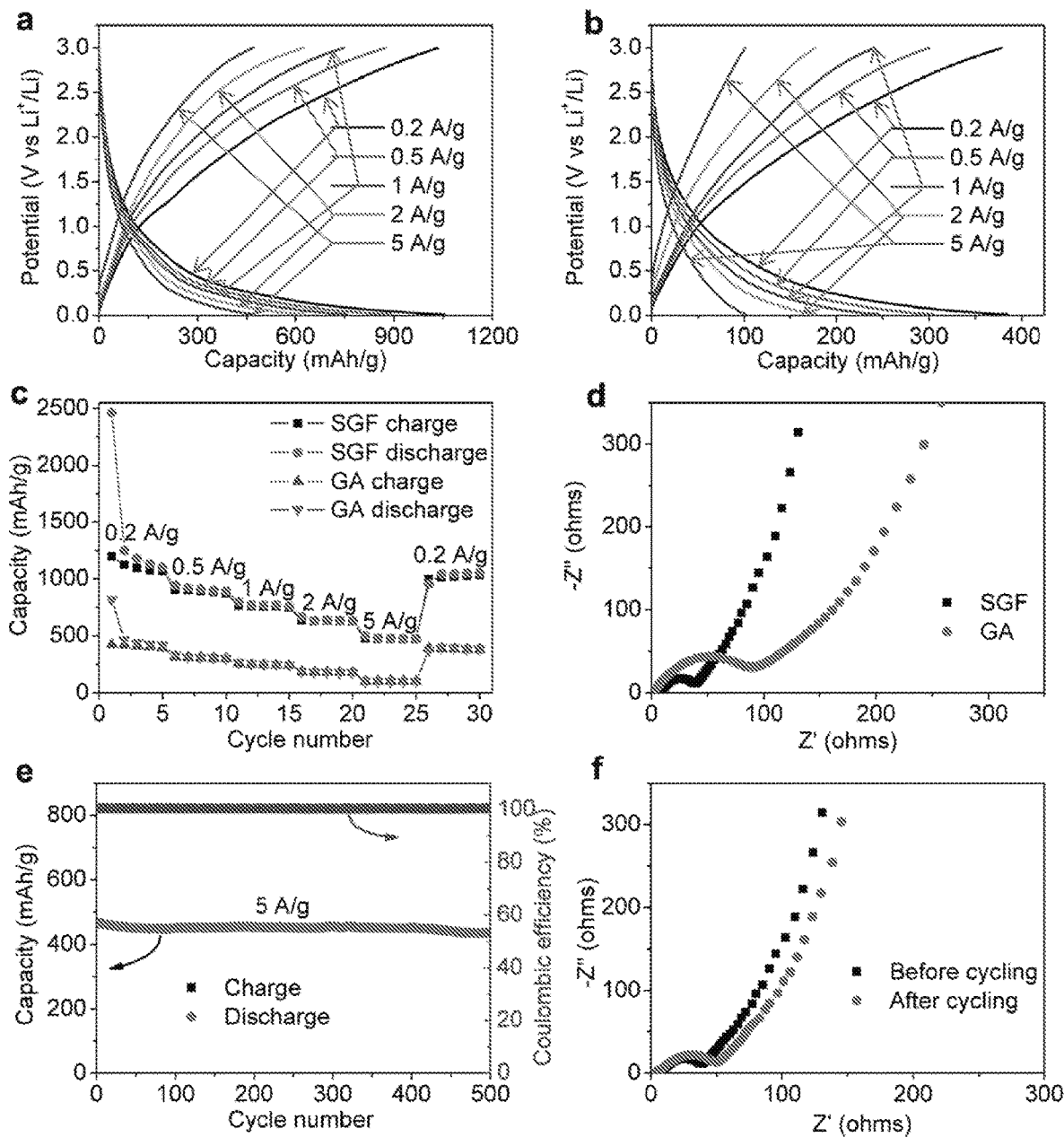
FIG. 6: a, b) Galvanostatic charge/discharge profiles of (a) SGF and (b) GA electrodes. c) Rate capabilities and cycle performance of SGF and GA electrodes obtained over a wide range of current densities from about 0.2 to about 5.0 A g$^{-1}$. d) Nyquist plots of SGF and GA electrodes. e) Cycling stability of SGF electrode at a high current density of about 5.0 A g$^{-1}$ after rate performance test. The charge and discharge capacities are essentially overlapped with each other due to the high Coulombic efficiency. f) Nyquist plots of SGF electrode before and after cycling test.

The rate performance of SGF and GA electrodes at different current densities were further studied (FIG. 6). At a current density of about 0.2 A g$^{-1}$, the SGF electrode can be reversibly charged to about 1066 mAh g$^{-1}$ in the fifth cycle, which is much higher than that of GA electrode (about 397 mAh g$^{-1}$). When the current density was increased to about 0.5, about 1.0 and about 2.0 A g$^{-1}$, the SEF electrode can deliver reversible capacities of about 875, about 749 and about 626 mAh respectively. More importantly, even at a very high current density of about 5.0 A g$^{-1}$, a stable reversible capacity of about 472 mAh g$^{-1}$ can still be achieved for the SGF electrode, which is about 3.7 times higher than that of the GA electrode (about 101 mAh g$^{-1}$). When the current density was returned to the initial about 0.2 A g$^{-1}$, a reversible capacity of about 1034 mAh g$^{-1}$ can be recovered (FIG. 6c). Moreover, the kinetic features of the charge/discharge curves at high current densities were similar to those at low current densities (FIG. 6a). For graphene electrode materials, the capacity below about 0.5 V (vs. Li$^+$/Li) typically comes from lithium intercalation into the graphene layers, while the capacity above about 0.5 V (vs. Li$^-$/Li) typically is mainly associated with the Faradic capacitance on the surface or the edge sites of the graphene sheets. Therefore, the capacities arising from lithium intercalation for the SGF electrode are about 903 and about 322 mAh g$^{-1}$ at about 0.1 and about 5.0 A g$^{-1}$, respectively, contributing as high as about 78% and about 68% of the total capacity of SGF electrode, respectively, which are significantly higher than those of the GA electrode (about 70% and about 51% at about 0.1 and about 5.0 A g$^{-1}$, respectively) especially at a high current density. These results indicate that the SGF electrode has a more favorable charge transport and ion diffusion process than the GA electrode, which was confirmed by electrochemical impedance spectroscopy (EIS) measurements (FIG. 6d). The semicircle in the high-to-medium frequency regime of Nyquist plot is assigned to the charge-transfer resistance between electrode and electrolyte, while the 45° inclined line is the Warburg region associated with lithium ion diffusion in the electrode. Of note, the SGF electrode exhibited a smaller semicircle diameter and a shorter 45° Warburg region, indicating a lower charge-transfer resistance and more efficient lithium ion diffusion within the SEF electrode.

The SGF electrode also demonstrated excellent cycling stability after rate performance test with a high reversible capacity of about 435 mAh g$^{-1}$ and a remarkable capacity retention of about 93% over 500 charge/discharge cycles at a high current density of about 5.0 A g$^{-1}$ (FIG. 6e). The superior structural stability of SGF was also confirmed by similar Nyquist plots before and after cycling test (FIG. 6f), which can be attributed to the mechanically strong 3D porous network structure that can accommodate the volume change caused by repeated lithium insertion/extraction during the cycling test. Based on the above results, the significantly improved electrochemical performance of SGF compared to GA can be attributed to its unusual solvated hierarchical porosity given that the chemical structure of reduced GO in SGF and GA is substantially identical. First, a high surface area and solvated porous structure in SGF can provide large electrode/electrolyte interface and promote efficient and rapid lithium ion diffusion into substantially the entire graphene network including deep locations of stacked graphene layers. Second, an increased inter-sheet distance due to the solvation effect on the reduced (K) in SGF can expose more active sites for lithium storage.

Figure 10:
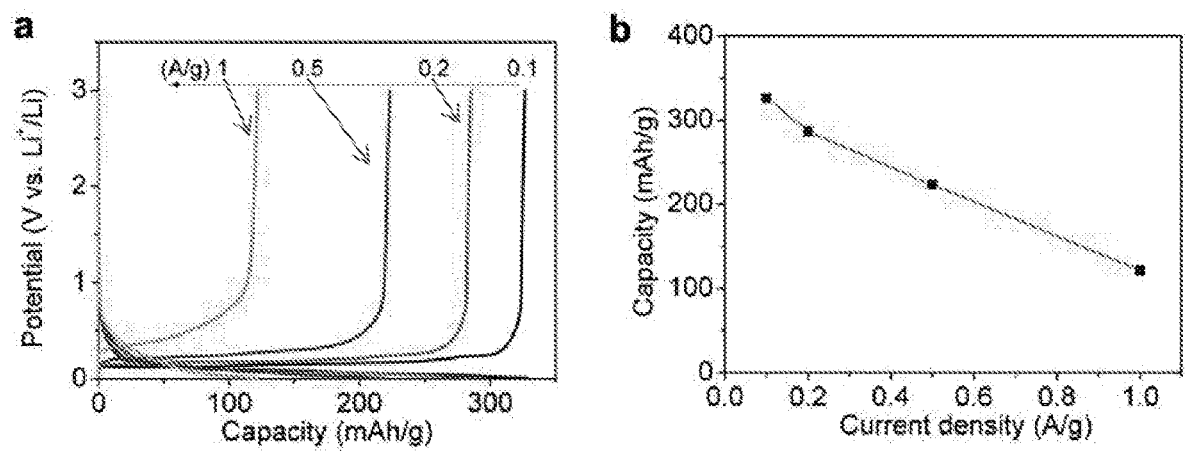
FIG. 10: a) Galvanostatic charge/discharge profiles and b the corresponding capacities of graphite electrode at different current densities.

The electrochemical performance of graphite as state-of-the-art anode material is tested for further comparison (FIG. 10). The graphite showed capacities of about 326 and about 121 mAh g$^{-1}$ at about 0.1 and about 1.0 A g$^{-1}$, respectively, which mainly derives from the lithium intercalation reaction (below about 0.5 V vs. Li$^+$/Li). The capacities of graphite are much lower than those of SGF electrode even considering just the capacity deriving from lithium intercalation (about 903 and about 550 mAh g$^{-1}$ at about 0.1 and about 1.0 A g$^{-1}$, respectively). It should also be noted that other studies on graphene-based anode materials typically report the gravimetric capacity and neglect the volumetric capacity. However, the volumetric capacity is another important metric to consider for many practical applications. Taking the packing density of graphite anode material as about 2.0 g cm$^{-3}$, the graphite can deliver volumetric capacities of about 652 and about 242 mAh cm$^{-3}$ at about 0.1 and about 1.0 A g$^{-1}$, respectively. With a high packing density of about 0.65 g cm$^{-3}$, the SGF electrode can achieve significantly higher volumetric capacities of about 753 and about 487 mAh cm$^{-3}$ at about 0.1 and about 1.0 A g$^{-1}$, respectively. Even considering just the contribution of lithium intercalation, the SGF electrode can still show excellent volumetric capacities of about 587 and about 358 mAh cm$^{-3}$ at about 0.1 and about 1.0 A g$^{-1}$, respectively, which approach that of graphite at low current density and greatly surpass that of graphite at high current density. The electrochemical performance of SGF is also comparable to that of the best graphene-based anode material among a wide range of chemically modified graphene and graphene hybrids (Additional Information, Table 1). It is worth noting that the SGF electrode of this example is free-standing without any other binders or additives and thus shows the highest capacity when normalized by the total weight of the entire electrode. Considering the scalable and low-cost preparation as well as relatively lower charge/discharge potential compared to other 3D graphene hybrids whose capacity mainly derives from the reaction above about 0.5 V (vs. Li$^+$/Li), SGFs are desirable anode materials for LIBs with higher energy and power densities.

In summary, this example reports the development of a convenient solvent exchange strategy to prepare SCRs of which the stacking of graphene sheets and interior microstructure within the pore walls are significantly different from those of unsolvated graphene frameworks. The SGFs can be used directly as additive-free LIB anode and exhibit greatly improved electrochemical performance compared to unsolvated graphene frameworks including high reversible capacity (about 1158 mAh g$^{-1}$ and about 753 mAh cm$^{-3}$ at about 0.1 A g$^{-1}$), excellent rate capability (about 472 mAh g$^{-1}$ and about 307 mAh cm$^{-3}$ at about 5.0 A g$^{-1}$) and superior cycling stability (about 93% capacity retention after 500 cycles at about 5.0 A g$^{-1}$), due to the higher specific surface area and faster lithium ion diffusion as well as increased intersheet distance arising from the unusual solvated porosity of SGFs. This example provides insights into the structure-property relationship of graphene frameworks, which will promote rational design and synthesis of 3D graphene materials for electrochemical energy storage and beyond. It should also be noted that there is a relatively large charge/discharge voltage hysteresis for the SGF anodes of this example, similar to chemically converted graphene anode materials, which can be further explored.

Experimental Section

Preparation of GO, GH and GA: GO was prepared by oxidation of natural graphite powder according to the modified Hummers' method. The GH was prepared using a modified hydrothermal reduction method. Briefly, about 0.3 mL of about 1 M ascorbic acid aqueous solution was added into about 6 mL of about 2 mg mL$^{-1}$ GO aqueous dispersion, and the mixture was sealed in a Teflon-lined autoclave and maintained at about 180° C. for about 2 h. The autoclave was naturally cooled to room temperature, and the as-prepared was taken out with a tweezer and washed by water to remove residual ascorbic acid for the following experiments. GA was prepared by freeze-drying of GEE using liquid nitrogen.

Preparation of SGFs: For preparation of SGFs with IL (1-ethyl-3-methylimidazolium tetrafluoroborate, EMIMBF4), the GH was immersed in neat EMIMBF$_4$ under vacuum at about 100° C. for about 12 h to exchange its interior water with EMIMBF$_4$. For preparation of SGFs with hydrophilic organic solvents, the GH was immersed in the fresh solvent with about 10 times volume under stirring for about 6 h, which was repeated by three times. For preparation of SGFs with LIB electrolyte, a piece of was first converted to SGF with EMIMBF$_4$ and then the EMIMBF$_4$ within the SGF was further exchanged with about 1 M LiPF$_6$ EC/DEC (about 1:1 v/v) electrolyte. For comparison, the GA was also immersed in EMIMBF$_4$ and about 1 M LiPF$_6$ EC/DEC electrolyte sequentially.

Materials Characterization: The morphologies of GHs and GAs were characterized by SEM (JEOL 6700) and TEM (FEI CM120). XRD data were collected on a Panalytical X'Pert Pro X-ray Powder Diffractometer with Cu-Kα radiation. MB dye adsorption method was employed to measure the specific surface areas of HGFs and GFs. MB adsorption is a standard method for measuring the specific surface area of graphitic materials, with 1 mg of adsorbed MB molecules covering 2.54 m$^2$ of surface area. The surface areas were calculated by adding a piece of GH or GA into a standard concentration of MB in de-ionized (DI) water for a total of about 48 h to reach adsorption equilibrium substantially completely. The MB concentration was determined by analyzing the supernatant through UV-vis spectroscopy at a wavelength of about 665 nm and compared to the initial standard concentration of MB prior to interacting with GH or GA. Raman spectra were measured and collected using an about 632.8 nm laser with a Renishaw 1000 under ambient conditions.

Electrochemical Measurements: Working electrode was prepared by direct pressing of a piece of SGF or GA with electrolyte on copper foil under about 100 MPa pressure during which the squeezed electrolytes were removed by filter papers. The mass loading of graphene is about 2 mg cm$^{-2}$. To determine the packing density of SGF electrode, the volume (V) is calculated by measuring the radius (r) and thickness (h) of the pressed SGF film (V=h×π×r$^2$), and directly weighting the net mass of the dried SGF film after removal of interior electrolyte by repeated washing. The packing density is thus obtained by dividing the net mass by the volume of the SGF film. The graphite electrode was prepared by mixing about 95 wt % graphite powder and about 5 wt % polyvinylidene fluoride binder in N-methyl-2-pyrrolidinone and coating the above mixture slurry on copper foil followed by vacuum drying at about 120° C. and pressing. The mass loading of graphite is about 2 mg cm$^{-2}$. The Li/SGF cells were assembled in an argon-filled glovebox with less than about 1 ppm of oxygen and water, using lithium metal as the counter/reference electrode, a Celgard 2400 membrane separator, and about 1 M LiPF$_6$ electrolyte solution dissolved in a mixture of EC and DEC (about 1:1 v/v). CR2032 (about 3 V) coin-type cells were used for electrochemical measurements. All the electrochemical experiments were carried out using VersaSTAT 4 from Princeton Applied Research. Galvanostatic charge/discharge cycles were tested at various current densities of about 0.1 to about 5.0 A g$^{-1}$ between about 3.0 and about 0.01 V versus Li$^+$/Li at room temperature. EIS studies were carried out at open circuit potential with a sinusoidal signal over a frequency range from about 100 kHz to about 10 mHz at an amplitude of about 10 mV.

Additional Information

TABLE 1

Electrochemical performance of graphene-based anode materials tested between about 3.0 and about 0.01 V versus Li$^+$/Li.

| Materials | Ratio of active materials | Mass loading | Current density | Capacity | Current density | Capacity |
|---|---|---|---|---|---|---|
| Nitrogen-doped graphene | 80 wt % | NA | 0.1 A/g | 832 mAh/g | 5 A/g | 410 mAh/g |
| CVD-graphene | 80 wt % | NA | 0.07 A/g | 887 mAh/g | 3.5 A/g | 300 mAh/g |
| Laser-scribed graphene paper | 100 wt % | NA | 0.37 A/g | 545 mAh/g | 1.86 A/g | 335 mAh/g |
| Porous graphene network | 80 wt % | NA | 0.18 A/g | 955 mAh/g | 3.7 A/g | 298 mAh/g |
| Phosphorus-doped graphene | 75 wt % | NA | 0.1 A/g | 460 mAh/g | 2 A/g | 190 mAh/g |
| Nitrogen-doped graphene | 70 wt % | 1 mg/cm$^2$ | 0.5 A/g | 798 mAh/g | 5 A/g | 290 mAh/g |
| Nitrogen-doped graphene | 85 wt % | NA | 0.05 A/g | 936 mAh/g | 2 A/g | 439 mAh/g |
| N-doped graphene | 70 wt % | NA | 0.05 A/g | 872 mAh/g | 5 A/g | 296 mAh/g |
| B-doped graphene | 70 wt % | NA | 0.05 A/g | 1227 mAh/g | 5 A/g | 380 mAh/g |
| CVD graphene papers | 100 wt % | 0.5 mg/cm$^2$ | 0.05 A/g | 701 mAh/g | 0.5 A/g | 191 mAh/g |
| Freeze-dried graphene | 80 wt % | NA | 0.1 A/g | 1000 mAh/g | 5 A/g | 275 mAh/g |
| Graphene/C$_{60}$ | 95 wt % | NA | 0.05 A/g | 784 mAh/g | NA | NA |
| Disordered graphene | 80 wt % | NA | 0.05 A/g | 794-1054 mAh/g | NA | NA |
| Holey graphene paper | 100 wt % | 0.3 mg/cm$^2$ | 0.05 A/g | 403 mAh/g | 2 A/g | 178 mAh/g |
| Holey graphene powder | 80 wt % | 1 mg/cm$^2$ | 0.02 A/g | 889 mAh/g | 3.7 A/g | 147 mAh/g |
| Mesoporous carbon sheet | 85 wt % | NA | 0.1 A/g | 770 mAh/g | 5 A/g | 255 mAh/g |
| 3D Fe$_2$O$_4$/graphene aerogel | 80 wt % | NA | 0.2 A/g | 990 mAh/g | 1.6 A/g | 730 mAh/g |
| 3D Co$_2$O$_4$/graphene foam | 70 wt % | NA | 0.2 A/g | 710 mAh/g | 4.4 A/g | 130 mAh/g |
| 3D Fe$_2$O$_3$/graphene aerogel | 100 wt % | 2 mg/cm$^2$ | 0.1 A/g | 1062 mAh/g | 2.5 A/g | 280 mAh/g |
| 3D Fe$_2$O$_3$/graphene foam | 100 wt % | 0.76 mg/cm$^2$ | 0.2 A/g | 871 mAh/g | 5 A/g | 587 mAh/g |
| 3D SnO$_2$@C/graphene aerogel | 75 wt % | 1 mg/cm$^2$ | 0.1 A/g | 1026 mAh/g | 1 A/g | 499 mAh/g |
| 3D MoS$_2$/graphene aerogel | 80 wt % | 1.5 mg/cm$^2$ | 74 mA/g | 1216 mAh/g | 1.86 A/g | 711 mAh/g |
| 3D Fe$_3$O$_4$/graphene foam | 100 wt % | NA | 0.37 A/g | 785 mAh/g | 5.5 A/g | 400 mAh/g |
| 3D MoS$_2$/graphene foam | 100 wt % | NA | 0.1 A/g | 877 mAh/g | 4 A/g | 466 mAh/g |
| 3D SnS$_2$/graphene aerogel | 70 wt % | NA | 0.05 A/g | 656 mAh/g | 1 A/g | 240 mAh/g |
| 3D Fe$_2$O$_3$/graphene aerogel | 80 wt % | 1 mg/cm$^2$ | 0.1 A/g | 995 mAh/g | 5 A/g | 372 mAh/g |
| 3D Fe$_3$O$_4$/N-doped graphene aerogel | 80 wt % | NA | 0.1 A/g | 1014 mAh/g | 1.6 A/g | 648 mAh/g |
| 3D Fe$_3$O$_4$/graphene aerogel | 80 wt % | NA | 0.15 A/g | 856 mAh/g | 4.8 A/g | 363 mAh/g |
| 3D CoO/graphene aerogel | 80 wt % | NA | 0.1 A/g | 1026 mAh/g | 2.4 A/g | 457 mAh/g |
| 3D SnO$_2$/graphene aerogel | 80 wt % | 0.6 mg/cm$^2$ | 0.1 A/g | 1171 mAh/g | 4 A/g | 500 mAh/g |

TABLE 1-continued

Electrochemical performance of graphene-based anode materials tested between about 3.0 and about 0.01 V versus Li$^+$/Li.

| Materials | Ratio of active materials | Mass loading | Current density | Capacity | Current density | Capacity |
|---|---|---|---|---|---|---|
| 3D Fe$_2$O$_3$/graphene aerogel | 80 wt % | NA | 0.1 A/g | 1250 mAh/g | 5 A/g | 460 mAh/g |
| 3D Sn/graphene framework | 80 wt % | NA | 0.2 A/g | 1022 mAh/g | 5 A/g | 459 mAh/g |
| 3D WS$_2$/graphene aerogel | 100 wt % | 1.88 mg/cm$^2$ | 0.1 A/g | 693 mAh/g | 1 A/g | 394 mAh/g |
| SGF | 100 wt % | 2 mg/cm$^2$ | 0.1 A/g | 1158 mAh/g | 5 A/g | 472 mAh/g |

Note:
The capacity values reported for other graphene-based anode materials shown above are normalized by the mass of active electrode materials alone. In contrast to the additive-free SGF electrodes, polymer binder (usually polyvinylidene fluoride or polytetrafluoroethylene) and conductive additive (usually carbon black) are typically used to mix with active materials to form electrodes. These additives account for about 10-20 wt. % of the overall electrode materials. Therefore, the SGF electrodes show the highest capacities at various current densities among a wide range of graphene-based anode materials when normalized by the total weight of the entire electrode.

As used herein, the singular terms "a," "an," and "the" include plural referents unless the context clearly dictates otherwise. Thus, for example, reference to an object can include multiple objects unless the context clearly dictates otherwise.

As used herein, the term "set" refers to a collection of one or more objects. Thus, for example, a set of Objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation of less than or equal to ±10% of that numerical value, such as less than or equal to ±5%, less than or equal to ±4?, less than or equal to ±3%, less than or equal to ±2%, less than or equal to +1%, less than or equal to +0.5%, less than or equal to ±0.1%, or less than or equal to ±0.05%.

As used herein, the terms "connect," "connected," and "connection" refer to an operational coupling or linking. Connected objects can be directly coupled to one another or can be indirectly coupled to one another, such as via another set of objects.

As used herein, the term "size" refers to a characteristic dimension of an object. Thus, for example, a size of an object that is spherical can refer to a diameter of the object. In the case of an object that is non-spherical, a size of the non-spherical object can refer to a diameter of a corresponding spherical object, where the corresponding spherical object exhibits or has a particular set of derivable or measurable properties that are substantially the same as those of the non-spherical object. When referring to a set of objects as having a particular size, it is contemplated that the objects can have a distribution of sizes around the particular size. Thus, as used herein, a size of a set of objects can refer to a typical size of a distribution of sizes, such as an average size, a median size, or a peak size.

While the disclosure has been described with reference to the specific embodiments thereof, it should be understood by those skilled in the art that various changes may be made and equivalents may be substituted without departing from the true spirit and scope of the disclosure as defined by the appended claims. In addition, many modifications may be made to adapt a particular situation, material, composition of matter, method, operation or operations, to the objective, spirit and scope of the disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations is not a limitation of the disclosure.

What is claimed is:

1. A lithium-ion battery comprising:
   an anode comprising a solvated graphene framework film of interconnected graphene sheets, wherein the solvated graphene framework forms a 3-dimensional hierarchical network of pores formed between stacked and interconnected graphene sheets, and wherein the basal planes of the graphene sheets comprise nanopores;
   a cathode; and
   an electrolyte disposed between the anode and the cathode and including lithium ions,
   wherein the solvated graphene framework of the anode is infiltrated by the electrolyte, and wherein the solvated graphene framework film has a specific surface area of 600 m$^2$ g$^{-1}$ or more.

2. The lithium-ion battery of claim 1, wherein the specific surface area of the solvated graphene framework film is 900 m$^2$ g$^{-1}$ or more.

3. The lithium-ion battery of claim 1, wherein the solvated graphene framework film has a packing density of 0.3 g cm$^{-3}$ or more.

4. The lithium-ion battery of claim 1, wherein at least one of the nanopores has a size in the range of 1 nm to 100 nm.

5. The lithium-ion battery of claim 1, wherein the anode further includes an electrochemically active material incorporated in the solvated graphene framework film.

6. The lithium-ion battery of claim 1, wherein the anode has a discharge or charge capacity when cycled at a current density of about 0.1 A g$^{-1}$ for 30 cycles of at least about 500 mAh g$^{-1}$.

7. The lithium-ion battery of claim 1, wherein the anode has a discharge or charge capacity, when cycled at a current density of about 5.0 A g$^{-1}$ for 30 cycles of at least about 150 mAh g$^{-1}$.

8. The lithium-ion battery of claim 1, wherein the anode has a capacity retention over 500 charge/discharge cycles of at least about 50%.

9. The lithium-ion battery of claim 1, wherein the solvated graphene framework film has an electrical conductivity of at least about 500 S m$^{-1}$.

10. The lithium-ion battery of claim 1, wherein the pores of the solvated graphene framework film form a hierarchical porous structure that forms a continuous network of open channels for ion transport.

11. The lithium-ion battery of claim 1, wherein the electrolyte comprises a lithium salt dispersed in an organic solvent.

12. The lithium-ion battery of claim 1, wherein the pores between the interconnected graphene sheets have a diameter of about 5 nm to about 10 μm.

\* \* \* \* \*